(12) United States Patent
Holzrichter

(10) Patent No.: US 8,532,987 B2
(45) Date of Patent: Sep. 10, 2013

(54) SPEECH MASKING AND CANCELLING AND VOICE OBSCURATION

(75) Inventor: John F. Holzrichter, Berkeley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 344 days.

(21) Appl. No.: 13/018,653

(22) Filed: Feb. 1, 2011

(65) Prior Publication Data

US 2012/0053931 A1  Mar. 1, 2012

Related U.S. Application Data

(60) Provisional application No. 61/376,492, filed on Aug. 24, 2010, provisional application No. 61/376,515, filed on Aug. 24, 2010.

(51) Int. Cl.
  *G10L 21/02* (2006.01)
  *G10K 11/16* (2006.01)

(52) U.S. Cl.
  USPC .......... 704/226; 381/71.1; 381/73.1; 702/191

(58) Field of Classification Search
  USPC ............... 704/214, 215, 226, 228; 381/71.2, 381/71.7, 71.9, 73.1, 71.1; 702/191
  See application file for complete search history.

(56) References Cited

U.S. PATENT DOCUMENTS

| | | | | |
|---|---|---|---|---|
| 3,879,578 A * | 4/1975 | Wildi | ............................ | 381/73.1 |
| 4,052,564 A * | 10/1977 | Propst et al. | ................. | 381/73.1 |
| 4,476,572 A * | 10/1984 | Horrall et al. | ................ | 381/73.1 |
| 5,590,241 A * | 12/1996 | Park et al. | ....................... | 704/227 |
| 5,699,436 A * | 12/1997 | Claybaugh et al. | .......... | 381/71.6 |
| 5,729,694 A | 3/1998 | Holzrichter et al. | | |
| 6,006,175 A | 12/1999 | Holzrichter | | |
| 6,343,269 B1 * | 1/2002 | Harada et al. | ................. | 704/243 |
| 6,377,919 B1 * | 4/2002 | Burnett et al. | ................ | 704/231 |
| 6,542,857 B1 | 4/2003 | Holzrichter et al. | | |
| 6,711,539 B2 * | 3/2004 | Burnett et al. | ................ | 704/223 |
| 6,999,924 B2 * | 2/2006 | Burnett et al. | ................ | 704/233 |
| 7,035,795 B2 * | 4/2006 | Burnett et al. | ................ | 704/223 |
| 7,089,177 B2 * | 8/2006 | Burnett et al. | ................ | 704/203 |
| 7,143,028 B2 * | 11/2006 | Hillis et al. | .................... | 704/203 |
| 7,191,105 B2 * | 3/2007 | Holzrichter et al. | ............. | 703/2 |
| 7,283,948 B2 * | 10/2007 | Holzrichter et al. | ............. | 704/2 |
| 8,019,091 B2 * | 9/2011 | Burnett et al. | ............... | 381/71.8 |
| 2001/0021905 A1 * | 9/2001 | Burnett et al. | ................ | 704/233 |
| 2002/0184012 A1 * | 12/2002 | Burnett et al. | ................ | 704/223 |
| 2002/0198690 A1 * | 12/2002 | Holzrichter et al. | .......... | 702/195 |
| 2003/0149553 A1 * | 8/2003 | Holzrichter | ........................ | 703/2 |
| 2003/0179888 A1 * | 9/2003 | Burnett et al. | ............... | 381/71.8 |
| 2004/0133421 A1 * | 7/2004 | Burnett et al. | ................ | 704/215 |
| 2011/0299695 A1 * | 12/2011 | Nicholson | .................... | 381/71.6 |

OTHER PUBLICATIONS

John Holzrichter, "Non-acoustic, EM wave Sensors for Speech Applications", 2008, 48 Pages.*

* cited by examiner

*Primary Examiner* — Martin Lerner
(74) *Attorney, Agent, or Firm* — Eddie E. Scott

(57) ABSTRACT

A non-acoustic sensor is used to measure a user's speech and then broadcasts an obscuring acoustic signal diminishing the user's vocal acoustic output intensity and/or distorting the voice sounds making them unintelligible to persons nearby. The non-acoustic sensor is positioned proximate or contacting a user's neck or head skin tissue for sensing speech production information.

11 Claims, 2 Drawing Sheets

SPEECH MASKING AND CANCELLING AND VOICE OBSCURATION

CROSS-REFERENCE TO RELATED APPLICATIONS

The present application claims benefit under 35 U.S.C. §119(e) of U.S. Provisional Patent Application No. 61/376,492 filed Aug. 24, 2010 entitled "Voice Obscuration System" and U.S. Provisional Patent Application No. 61/376,515 filed Aug. 24, 2010 entitled "Speech Masking and Cancelling Method and Device." The disclosures of U.S. Provisional Patent Application No. 61/376,492 filed Aug. 24, 2010 and U.S. Provisional Patent Application No. 61/376,515 filed Aug. 24, 2010 are hereby incorporated in this application by reference for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to speech and more particularly to obscuring acoustic speech.

2. State of Technology

State of technology information is provided by U.S. Pat. No. 5,729,694 issued Mar. 17, 1998 to John F. Holzrichter and Lawrence C. Ng for speech coding, reconstruction and recognition using acoustics and electromagnetic waves; U.S. Pat. No. 6,006,175 issued Dec. 21, 1999 to John F. Holzrichter for methods and apparatus for non-acoustic speech characterization and recognition; and U.S. Pat. No. 6,542,857 issued Apr. 1, 2003 to John F. Holzrichter, Greg C. Burnett, and Lawrence C. Ng for a system and method for characterizing synthesizing and/or canceling out acoustic signals from inanimate sound sources. The entire disclosures of U.S. Pat. Nos. 5,729,694; 6,006,175; and 6,542,857 are incorporated in this patent application in their entirety for all purposes.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

Human users of cell phones and other acoustic microphone based systems generate an acoustic voice signal for purposes of communication, entertainment, and other applications. The acoustic voice signal is measured by a microphone in the cell phone body or a microphone in a hand held microphone unit. The voice-induced acoustic pressure waves radiate around and beyond the microphone and can be overheard by other persons nearby. The radiating voice-induced acoustic pressure waves can be bothersome to others in the work place. The radiating voice-induced acoustic pressure waves can also be disruptive in public meetings. Also, the voice-induced acoustic pressure waves radiating around and beyond the microphone can be intercepted by electronic surveillance devices or simply overheard creating privacy and security concerns.

The present invention provides a non-acoustic sensor to measure a user's speech production, an acoustic sensor to measure user's speech emissions, and then broadcasts an obscuring acoustic signal diminishing the user's vocal acoustic output intensity and/or distorting the voice sounds making them unintelligible to persons nearby. The present invention prevents the user's voice signal from being overheard by other persons nearby. The present invention has use in preventing the user's voice signal from being bothersome to others in the work place and from being disruptive in a public meeting. Also, the present invention has use in preventing the user's voice signal from being intercepted by electronic surveillance devices or simply overheard thereby preventing privacy and security concerns. The present invention enables background noise removal from a microphone signal and enables microphone signal-bandwidth compression by factors of greater than 10×.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
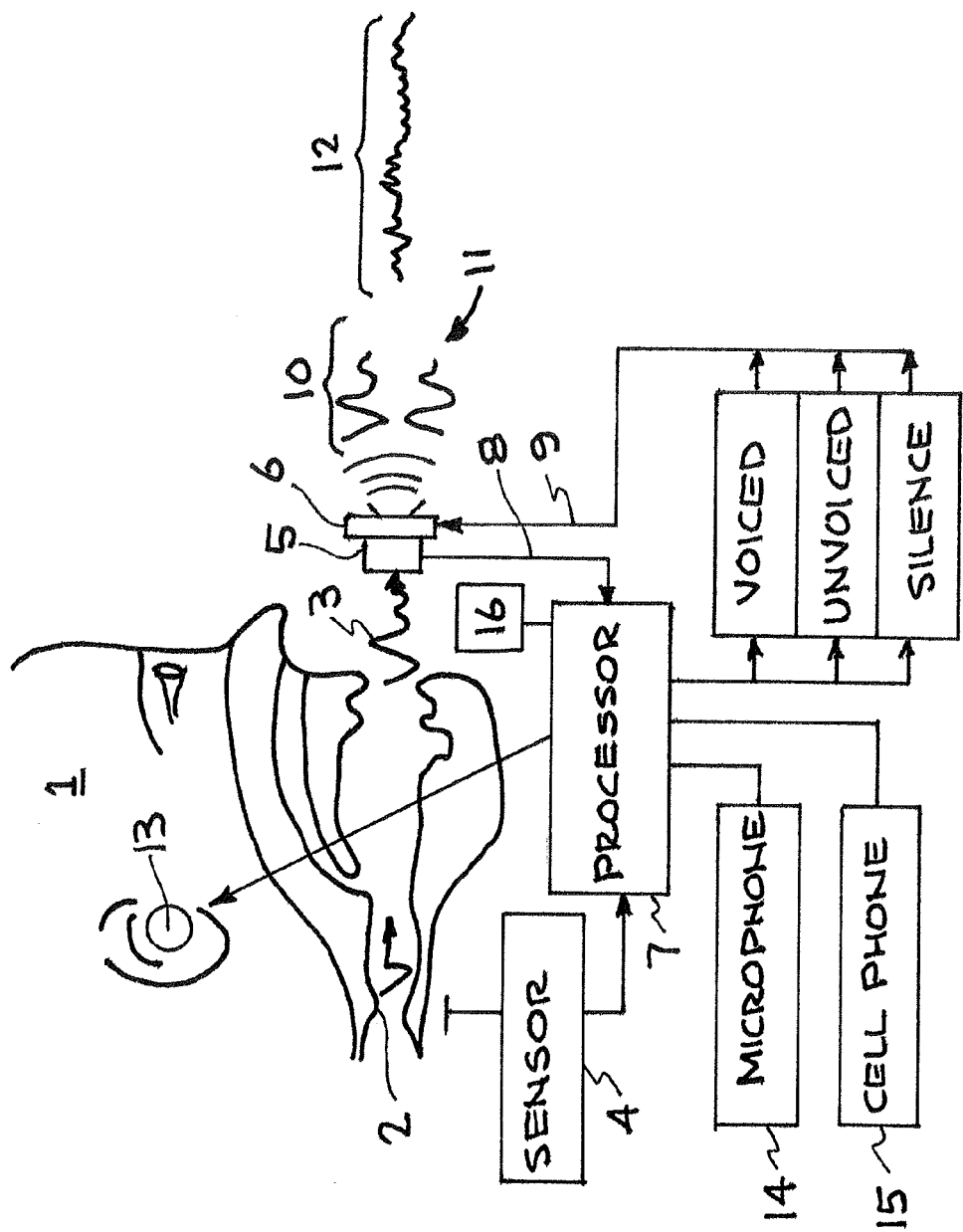
FIG. 1 illustrates one embodiment of a system constructed in accordance with the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The ever increasing use of cell phones causes noise pollution. For example, the use of cell phones often causes distraction to coworkers. The use of a cell phone during a meeting disrupts the meeting. In addition, cell phone conversations can be overheard thereby compromising sensitive information.

The present invention provides a voice obscuration, speech masking and cancelling system. In one embodiment, the present invention provides a system of combined non-acoustic+acoustic sensors for measuring a user's speech and then broadcasting an obscuring acoustic signal diminishing the user's vocal acoustic output intensity and/or distorting the voice sounds making them unintelligible to persons nearby. The present invention has use in preventing the user's voice signal from being intercepted by electronic surveillance devices or simply overheard thereby overcoming privacy and security concerns.

Low power radar-like sensors can be used to obtain real time speech information from a speaking person by sensing internal and surface tissue motions in and near the speaker's vocal tract, especially below the jaw. Real time speech information from a speaking person can also be obtained by laser interferometers that obtain skin surface vibration information. The real time speech information, which is not affected by noise outside the speaker's body (including his/her own speech), is obtained in the form of an electric signal in advance of the user's actual speech sounds leaving its mouth and nose. This signal, combined with prior user's speech information and background noise information can be inverted, filtered, time aligned, and then broadcast with perfect timing from one or more small speakers on or near the person's head-neck area, to obscure real-time speech sounds from said user. Other types of sensors, in addition to micro-radar sensors, can be used to detect vocal fold motion, which provides critical data on the onset, signal shape, type of speech, and end of each voiced speech period.

When a human generates acoustic sounds, commonly in the form of speech, a stream of acoustic pressure waves are produced which leave the human speaker's mouth, nose, and head-neck skin surfaces. In addition to those waves which leave the body, related waves vibrate inside the vocal tract of the speaker. Said vocal tract extends, nominally, from the vocal folds (located just below the Adam's apple) up to and out the mouth opening as well as up and out the nostril openings in the nose. These internal speech sounds cause the speaker's skin surfaces of the neck and face to vibrate which also generate low level acoustic sound waves. The resultant external acoustic pressure waves from all orifices and surfaces travel at the speed of sound through air to microphones, as well as to nearby people, and often bounce around inside rooms or enclosed spaces (as echoes) and eventually are absorbed. These user generated sounds are very useful for communication through microphones and through direct speech to another person (or animal). However to people not involved in the communication process these signals are bothersome, or worse contain information that the speaker would prefer not to be known to another person. Also, echoes of the speaker's own speech can return to a microphone and cause unwanted noise. This invention describes a way to minimize and make unintelligible speech signals that travel through the air to another person, and at the same time enable clear communication signals for telephony, speech recognition, and other applications.

A problem with prior art noise cancellation of human speech is that it is extremely difficult for microphones and processors to react fast enough to generate a canceling or obscuring acoustic sound to "catch up with" and cancel or obscure a user's sounds as they are being spoken. A second problem is that the cancellation sound "leaks" in the backward direction toward the user's mouth and distorts the user's speech and hearing. This effect prevents a prior art microphone from capturing the desired voice quality of the speaker under canceling or obscuring conditions. The present invention provides a method of obtaining non-acoustic speech organ information, at the speed of light, so that a processor is able to describe the most important and energetic portions of a user's speech patterns in advance, during a typical 0.5 millisecond-period, before the time when the actual speech-sound leaves the user's mouth. This enables the processor to generate an obscuring or canceling signal with perfect timing and with needed amplitude and phase adjustments for obscuring and canceling. Hence the inventive system can cause a reduction in speech intensity and a change in the speech signal pressure-versus-time pattern at the location of a nearby listener, who then can't understand the user's speech, and will be much less bothered. At the some time, the actual communications signal, that the user intended to speak into a telephone or microphone, is obtained using a directional microphone in conjunction with a non-acoustic sensor signal which enables a processor, using prior art noise-canceling algorithms (See U.S. Pat. Nos. 5,729,694; 6,006,175 and 6,542,857) to reduce both undesired background sounds and undesired backward-flowing loud-speaker canceling sounds. Hence the intended communications signal to other parties and to the user is not affected by external noise or the broadcasting of an obscuring sound signal to an eavesdropping listener.

It has been found that intense external sounds do not modify the sounds inside the human vocal tract, nor do they modify skin vibrations—caused by internal vocal tract vibrations. Furthermore, they do not change tissue motions associated with vocal fold motions. Hence non-acoustic speech sensors that measure internal vocal tract tissue motions, such as caused by vocal fold opening and closing, or internal pressure waves versus time, or that measure skin surface vibrations versus time will not be contaminated by external speech or noise signals, whether they are generated by the user or by other persons or by noise generating sources. Examples of the non-acoustic sensors are: low power radar like sensors or radar interferometers that measure vocal tract wall vibrations inside the neck, accelerometers attached to the skin surface, small cameras attached in a front-of-mouth location, such as on a microphone to measure mouth opening and other feature changes, and laser diode interferometers that measure skin surface vibrations that are caused by internal vocal tract speech-production related air pressure pulses.

The process of cancellation and obscuration begins with identification of one of three user's speech types (for American English speech). Obscuration and canceling of voiced speech (the speech type caused by vocal fold opening and closing) is accomplished using two sensors whose signals are separated in time with respect to one another. The 2nd type of speech, unvoiced speech, caused by air flow sounds such as "sss" or "kkk", occurs shortly before voiced speech is detected by neck tissue motions or it occurs shortly after voiced speech segments cease, after vocal fold motions cease. Canceling of unvoiced speech is not discussed herein because it is mostly described as chaotic "pink noise", but obscuring said unvoiced speech is straightforwardly accomplished because unvoiced speech segments are usually short in duration, low in intensity and easily obscured by broadcasting low level white noise, pink noise, pseudo-random or other determinate noise, or prior recorded background noise for periods of time lasting seconds after unvoiced speech onset is detected (See U.S. Pat. No. 6,542,857) and after voiced speech terminates. The 3nd type of speech, Silent speech, is identified by sensing no vocal fold tissue motions with a non-acoustic sensor and by sensing no user speech emissions with an acoustic sensor. It is part of this invention to modify the background noise by purposely broadcasting low level determinate noise from the apparatus loud speaker over long periods of time, while a user is speaker, waiting, turning the system on or off, in order to obscure low level speech sounds made by the speaker—such as "hmmm"s, "ahhh"s. Said determinate noise signal is designed to be easily removed from the users speech signal using de-noising algorithms. In all 3 cases of speech the system sensors measure, the processor causes to be recorded in short term memories all sensed signals from non-acoustic and acoustic sensors, all obscuring and canceling signals, all background noise occurring during silent and other time periods, and control signals for limited periods of time such as 2 two seconds. Information needed for longer term work is recorded in longer term processor memory, or is sent to other systems or devices.

The generation of a canceling wave from the sensor's signal is straight forwardly accomplished by using the sensor signal and prior recorded speech segments, and then purposefully changing this information and re-broadcasting said speech segments to cause unintelligible distortion. Typical techniques include changing the amplitude sign of the recent (<10 msec), prior spoken speech signal over each pitch period, changing its amplitude and phase which will partially cancel and/or obscure the user's voice signal when properly timed. Then the processor adjusts the delay of the canceling signal in time such that by re-broadcasting the signal from one or more small loud-speakers simultaneously in time with the user's spoken signal, cancellation and obscuration will occur. Small speakers can be located near the face and/or neck or hand, or on the back side of an iPhone or other hand held microphone, or in an upper shirt pocket, or other location. Part of the inventiveness of this method's algorithm is to take advantage of the fact that that a voiced speech signal, containing most of the energy in the spoken voice, is measured inside the neck area (e.g., from the vocal tract inside the neck) and is obtained several 100s of microseconds before the speech leaves the mouth or nose openings. Hence there is sufficient time to do the processing of an instantly sensed tissue signal in conjunction with recordings of the user's recently spoken speech utterances, recently occurring means typically 5 to 20 milliseconds earlier, during the prior pitch period. Another inventive concept of this method is to take advantage of the fact that most voiced speech signals change very little over periods of 5 to 20 milliseconds, hence they can be inverted, adjusted in timing and in amplitude, and then re-broadcasted. This inventive approach to generating a re-broadcasted sound wave creates a reduction in speech-sound level at the listener and a distortion of speech meaning, leading to a reduction in recognition by nearby persons, and instruments, (i.e., it obscures the user's voice signal at the listener).

Another embodiment of the present invention includes the use of other types of sensors (other than micro-radar sensors) to detect vocal fold motion, which provides critical data on the onset, signal shape, and end of each voiced speech period. The present invention provides techniques for generating canceling and masking sound signals for all types of speech, including silent speech periods.

Referring now to FIG. 1; one embodiment of a voice obscuration, speech masking and canceling system is illustrated. The system includes a number of reference numerals identifying various elements of the system. The elements and the overall voice obscuration, speech masking and canceling system are described below.

Reference Numeral (1)—Speaker's head showing cutaway vocal tract, mouth, nose and ear locations, as well locations of several pieces of the Applicant's system.

Reference Numeral (2)—Vocal folds (2) which are the source of voiced speech, also provide information if no speech is being generated or if un-voiced speech is being generated. To make a voiced speech sound, the folds rapidly close, cutting of the air flow causing a sharp, negative sound wave indicated by the "V" in the drawing at location (3). The user's speech production sound, for voiced speech, is caused by vocal fold closure and takes about 0.4 milliseconds to reach the lip location indicated by the number (3), and a few more 0.1 milliseconds to reach microphone (5). In contrast, un-voiced speech sounds are commonly sensed by an opening of vocal folds often detected by sensor (4), a pink noise-like acoustic signal detected by microphone (5), and lip motions detectable by a camera or 2nd non-acoustic sensor (16).

Reference Numeral (3)—Exit location of vocal tract through mouth and nose, showing typical speech wave pattern in dark black. This is a typical voiced speech sound pattern, generated by the vocal folds at location (2).

Obscuration-waves for the three types of example speech are generated by the processor in a different way than for voiced speech. The use of the illustrated system and its components to choose the type of obscuring or canceling acoustic signal is determined by the processor algorithms based upon data from the sensor (4), the acoustic signal from microphone (5), data stored from prior speech time periods, prior art denoising algorithms, and models of the language being spoken. Prior art algorithms are used in the processor (e.g, U.S. Pat. No. 6,006,175 & U.S. Pat. No. 5,729,694 & U.S. Pat. No. 6,377,919 incorporated herein by this reference).

Reference Numeral (4)—For a voiced speech example, a radar-like sensor, or another type of sensor which detects the vocal fold tissues as they close, or it detects related tissue motions located next to the vocal folds such as the nearby skin surface. This sensor (4) sends a time of closure signal to a processor (7), which is a system digital and/or analog computer processor. The processor uses this signal and recent sound memory information from microphones (5) and (14) to generate an obscuring and canceling signal to loudspeaker (9).

Reference Numeral (5)—Acoustic microphone (5), with directional sensitivity, that receives speech sounds from the user (1): This microphone also receives lower level noise sounds and backward traveling sounds being broadcast by the system's loud-speaker (6). Said microphone (5) is much less sensitive to such indirect signals than it is to the direct speech from the speaker's mouth (3). Such microphones are often called directional or noise canceling microphones. Processor (7) records the present time spoken sounds from speaker (1), but it also keeps in its memory sounds from recent speech periods, also noise from recent past time periods, and other information needed to generate confusing/canceling signals in the present time. For example, upon detection of unvoiced-like speech primarily by microphone (5), a rapid response (in approximately 0.1 millisecond) of obscuring noise is generated almost simultaneously by the processor (7) and loudspeaker (6) and is commonly produced for a period longer in duration than the speaker's unvoiced speech signal, typically 0.5 seconds or more.

Reference Numeral (6)—A small loudspeaker located on the far side of the microphone (5) which is located in front of the speaker's mouth. The loudspeaker is designed to broadcast an obscuring acoustic signal (11) primarily in the forward direction, and to minimize backward directed sounds toward microphone (5). Said obscuring acoustic signal (11) is generated by the processor (7) and is conveyed to the loud speaker (6) by a wire or wireless channel (9). A resultant signal (12), comprised of speaker's acoustic speech (10) and obscuring signal (11), is in fact heard by a listener (usually at a low sound level). Said listener is hence made unable to understand the 2 combined acoustic sounds comprised of the original sound plus the obscuration and/or canceling sound.

Reference Numeral (7)—A digital or analog signal processor (e.g. a microcomputer) handles the timing, the recording of signals from the non-acoustic sensor (4) and the 2 microphones (5) and (14), and then generates a obscuring signal and/or canceling signal, perfectly timed, on a wire 9 which is sent to loud speaker (6). Each type of speech, e.g., voiced, unvoiced, silence, and others, is obscured and/or canceled using a differing acoustic signal. The processor has a memory to retain recently spoken (and recorded) acoustic speech signals (typically ~10-50 msec) and back ground noise signals (typically a few seconds) which are then used by obscuring algorithms in the processor. The algorithms, processor, and wires are used by the processor to send signals to the loudspeaker (6) for the purpose of obscuring/canceling the speaker's voice signal (10).

Reference Numeral (8)—Typical signal wires or wireless transmission channels that carry information between the sensors, to and from the processor, to the loud-speaker, and other devices such as a cell phone or smart phone (15).

Reference Numeral (9)—A wire or wireless channel which carries output signals from processor (7) to the loud speaker. The output signals on line (9) are tuned in time, in polarity, in amplitude, in duration, and in shape to cause voiced speech periods, unvoiced speech signals (e.g. such as ssss or kkk) speech periods to be obscured. Conditions of no speech being emitted by the speaker (1) are also detected, during which microphones (5) and (14) obtain background information to be used for de-noising of signals (8) and for simulating background noise to be generated by processor (7) and sent to loudspeaker at a later time (6).

Reference Numeral (10)—Typical negative, then positive-polarity speech pressure-waves for voiced speech travel from the mouth/nose regions (3) of the speaker (1), some of which passes by the microphone (5) and other devices such as a loud-speaker (6), or to a microphone in an iPhone (15), and which can be overheard by nearby listeners.

Reference Numeral (11)—A typical voiced speech canceling wave uses a positive, then negative polarity acoustic canceling wave, plus extra obscuring noise. It is sent in the forward direction by the loud speaker (6), which is driven by the processor (7) which uses microphones (14) and (5) to detect, time align, shape, and make the wave (11) which partially cancels and obscures the speaker's voice wave (10). Hence the resultant wave (12) is not understandable (i.e. it is obscured) by a listener.

Reference Numeral (12)—Estimated example of resultant, low intensity and shape-modified voiced speech signal from the combination of signals (10) and (11). This wave would be very difficult to hear and understand by a listener, in essence it has been made into low level noise, which is not bothersome to a listener.

Reference Numeral (13)—Typical ear-phone (13) which receives processed signals so that the speaker (1) can hear himself talk clearly in the presence of large background noise, as well as when the loudspeaker (6) is sending confusing signals to the listeners, with some leakage of the obscuring/canceling sound coming back to the speaker. In addition, system commands, cell phone signals from other persons, etc. are communicated to the speaker (1) using this earphone via noted wire or wireless channel.

Reference Numeral (14)—A second microphone (14) which samples local noise from the environment of the speaker 1. The noise is modified by processor (7) and used, with other information, to make confusing signals for broadcast by the speaker (6). Microphone (14) is also used to detect the quality of the combined obscuring and/or canceling signal and the original speech signal, providing feedback to the processor (7) in order to adjust timing, cancellation amplitudes and phases as needed for better performance.

Reference Numeral (15)—A smart phone, head set, etc. which connects this obscuring system to other systems, telephone lines, wireless channels, etc. This other system can be built into processor (7) and it can include microphone (8) and loudspeaker (9). Conversely, processor (7) can be built into system (15), as the user wishes.

One can measure very important parts of a speaker's voiced acoustic speech information at least 0.4 milliseconds before his/her speech signal exits the nose and/or mouth of the speaker. Other speech types obtain useful information as well. (See FIG. 2 to illustrate this point) The ability to obtain information in advance of voiced speech emissions from a user's mouth and nose is a key inventive part of this application, because it provides sufficient time for the processor to figure out what kind of speech is being spoken and then what kind of obscuring or canceling acoustic signal to generate and then broadcast from a small loudspeaker. However there are several other inventive points to keep in mind that makes this system work.

The glottal sensor (4) in conjunction with the microphone (5) tells the processor what kind of speech the speaker is producing. By knowing the type of speech, or in fact if there is no speech, or unvoiced speech the processor then knows how to cancel it or obscure it, by selecting the correct algorithm to use from its memory.

The fact that the processor can find and store one or more time-sequenced samples of the speaker's present and prior acoustic output periods (e.g., pitch periods), which are on-average similar in shape and amplitude to the present speech emission (needing cancellation or obscuring) is part of this inventive application.

The idea that the speech can be measured by the frontal microphone, and be de-noised, and recorded, with low noise, in its memory is inventive. At the same time, the processor also sends a de-noised signal to the user's earpod loudspeaker (13) so the user can hear what was just said in the presence of extra noise, including in the presence of the obscuring noise being intentionally produced.

The processor also keeps track of (i.e., records) the associated throat sensor signal segments (e.g., radar signal) to determine what kind of speech is being spoken for each speech period (a speech period is typically each 8 milliseconds). The throat data also indicates how strong the throat signal is and hence how loud the corresponding acoustic signal might be. Most of all, the instant measured and stored non-acoustic sensor (4) data provide unique data to enable accurate timing for generating the obscuring acoustic signal (as broadcast by the loudspeaker). This precise timing allows for very accurate canceling or obscuring of the speaker's natural speech as heard by a listener some meters away.

It is important to realize that it is not important to completely cancel speech. If one can cancel broadcasted acoustic sound by a factor of 100 or so (~20 db) which is difficult with prior systems, the speech may still be intelligible if a listener listens carefully and there is little background noise. However, Applicant's system will also add some background and/or prior speech noise and/or will shift the timing of the resultant speech signal so that a listener's ears (i.e., listener's hearing system) is unable to "lock-on" to the speaker's weakened and confused speech and begin to understand it. It is important to emphasize that one of the inventive aspects of Applicant's system is the capacity to both cancel and purposefully add obscuring noise at the same time. Applicant's obscuring system may generate several types of confusing acoustic signals such as strong background noise, white or pink noise, or time dithered speech from past speaker recordings, pitch-changed speech, signal shape-changes inserted into the speaker's signal, and other techniques, including simultaneously using 2 or more such just mentioned techniques.

Figure 2:
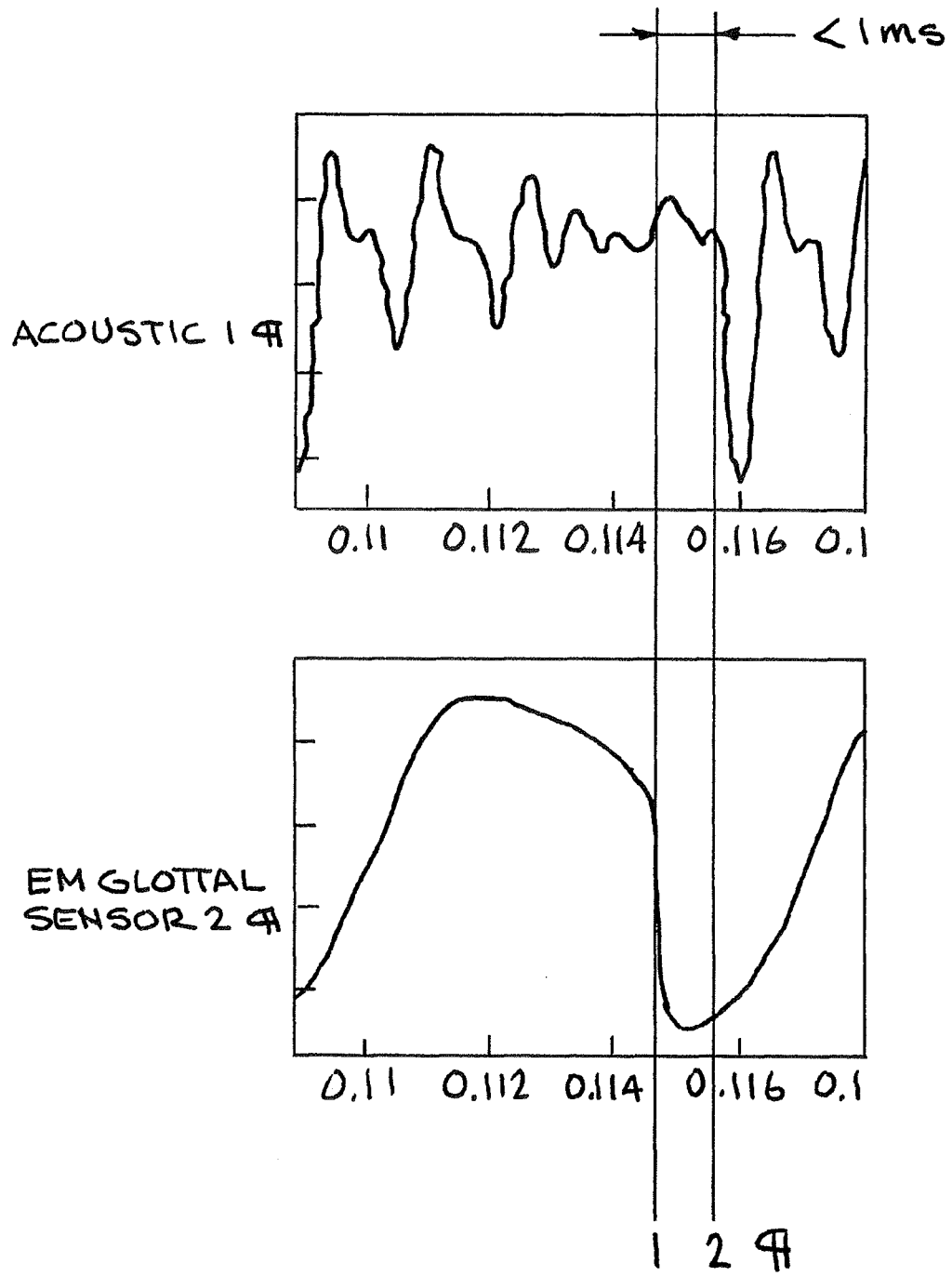
FIG. 2 shows a non-acoustic sensor signal and an acoustic sensor signal to illustrate the time difference which is used to implement the present invention.

Referring now to FIG. 2, two acoustic and non-acoustic signals illustrate the time difference between two sensors which are used to implement Applicant's system and methods. The first to appear and the fastest changing signal is from an EM Glottal Sensor signal 2 (See bottom trace in FIG. 2) which is dropping rapidly at timing line #1. The upper trace shows the corresponding Acoustic signal 1, which goes in the negative direction at timing line 2 due to the closure of the vocal folds and reduction in air flow and pressure (i.e., glottal opening closes). In summary, the two timing lines #1 and #2 show that the acoustic signal change is delayed relative to the glottal signal change by almost 1 msec in this example. This is due to the longer time the acoustic wave takes to travel up the vocal tract, out the mouth and nose, and to an acoustic microphone positioned in front of the mouth by several centimeters. In contrast, the EM glottal sensor measures vocal fold closure almost instantly.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for measuring properties of a user's speech production and user's acoustic speech emissions, including a processor for said apparatus signals using an algorithm, and then broadcasting an obscuring acoustic signal diminishing the user's vocal acoustic output intensity or distorting the voice sounds or both diminishing the user's vocal acoustic output intensity and distorting the voice sounds making them unintelligible to persons nearby, wherein the user has apparatus on or near the neck or head skin tissue, comprising:

one or more non-acoustic sensors proximate or contacting the user's neck or head skin-tissue for sensing speech production and producing speech-signal timing information, speech type identification information, and apparatus control signals for purposes of producing an obscuring and or canceling acoustic signal, and one or more acoustic sensors for measuring acoustic speech output of said user, for measuring the output of a loudspeaker together with user acoustic speech, and for measuring background noise, and a processor to process signals from said non-acoustic and said acoustic sensors, which employs algorithms for purposes of real time generation and broadcasting of obscuring and/or canceling acoustic signals appropriate to the types of speech being spoken by user, and also to remove noise entering acoustic sensors, and also to store in a memory prior and instant segments of both non-acoustic and acoustic speech signals, as well as obscured speech signals, and background noise signals, and a loudspeaker for generating acoustic signals for the purpose of diminishing the user's vocal acoustic output intensity, or for distorting the voice sounds, or for both diminishing the user's vocal acoustic output intensity and distorting the voice sounds making them unintelligible to persons and instruments nearby, and a second loudspeaker for purposes of transmitting the user's acoustic speech, as detected by an acoustic sensor and after noise is removed, into the user's ear or ears.

2. The apparatus of claim 1 wherein said non-acoustic sensor is a low-power electromagnetic radar.

3. The apparatus of claim 1 wherein said non-acoustic sensor is an electromagnetic interferometer with antenna.

4. The apparatus of claim 1 wherein said non-acoustic sensor is an accelerometer in contact with the user's neck or head skin tissue.

5. The apparatus of claim 1 wherein said non-acoustic sensor is a laser interferometer vibration sensor.

6. The apparatus of claim 1 wherein said non-acoustic sensor is a partially coherent optical vibration sensor.

7. The apparatus of claim 1 wherein said non-acoustic sensor is a microphone sensor in contact with the user's skin surface.

8. The apparatus of claim 1 wherein said non-acoustic sensor is a microphone proximate to user's neck skin, measuring skin vibrations traversing a short air path to said sensor.

9. The apparatus of claim 1 wherein said non-acoustic sensor is an electric field sensor that detects muscle electrical signals associated with motions of speech production tissues.

10. The apparatus of claim 1 wherein said non-acoustic sensor is an electronic camera that detects lip, jaw, and tongue motions.

11. The apparatus of claim 1 wherein said apparatus includes an electronic signal processor that uses an output signal from non-acoustic sensor proximate to neck, a second output signal from acoustic sensor proximate to user's mouth, and identifies a time period in advance of user's speech leaving user's mouth and nose, then during identified time period said processor generates and broadcasts a simultaneous obscuring and/or canceling acoustic signal to prevent user's speech from being overheard by nearby listeners or instruments.

* * * * *